INVENTORS
GEORGE OTTO ORTH, JR.
CLAUDE V. PEVEY
EVERETT J. REICHMAN
BY Seed & Berry
ATTORNEYS

United States Patent Office 3,245,870
Patented Apr. 12, 1966

3,245,870
PROCESS OF PRODUCING A WATER-RESISTANT AND FIRE-RETARDANT LIGNOCELLULOSIC PRODUCT
George Otto Orth, Jr., 538 6th Ave., Edmonds, Wash.; Claude V. Pevey, 16407 SE. 15th St., Bellevue, Wash.; and Everett Reichman, % Aguinaldo Development Corp., P.O. Box 277, Manila, Philippines
Filed May 14, 1964, Ser. No. 368,451
3 Claims. (Cl. 162—159)

This application is a continuation-in-part of application Serial No. 129,839, filed Aug. 7, 1961, which is a continuation-in-part of application Serial No. 851,420, filed Nov. 6, 1959, both now abandoned.

The present invention relates to the art of fabricating wet formed matted lignocellulosic products of the types used in the building trades, and particularly to the fabrication and articulation of such products as are commonly known as insulation board or soft board, including acoustical tile, thermal insulation board and the like, as well as products made from soft board or soft board matte, such as wet formed hardboard. More particularly, this invention relates to processes for impregnating such products with additives effective in imparting enhanced properties thereto, notably fire retardance and water resistance.

Matted lignocellulosic products are known to have inherently poor non-flammability characteristics and to have a tendency toward deterioration of shape and strength when water saturated. Accordingly, various mixtures of fire-retardant additives as well as sizings have been utilized to modify these deficiencies in an effort to meet the strict standards, codes and specifications recogniezd by architects, contractors, building owners, industry and goverenment. In addition to the strict fire test requirements including low flame spread and afterglow characteristics and the low water absorption limit (usually 10%) demanded, it is also required that the fire retardant additive is not deleterious to the fibers and will not deteriorate on aging, that the strength factor and acoustical characteristics of the product are not impaired thereby, and that the product can still be surface coated in a conventional manner. In general the present invention aims to provide a commercially practical and economical process for meeting all of these requirements.

In the prior art it has been appreciated that certain borate additives (borax) contribute fire retardant characteristics. However, when such were added to wet lignocellulosic mattes together with sizing, it was found necessary to also add to the wet matte substances deleterious to lignocellulose fibers in order to hold the pH of the matte in a low enough range during drying of the matte to keep the sizing precipitated. Accordingly, in carrying out the general objective of the present invention, it is aimed to find a way to utilize the fire retardant advantage of borate without having to add a substance deleterious to lignocellulose fibers in order to adequately control the pH to retain the sizing during drying of the matte.

It is also a significant object of the present invention to achieve, at the same time that the desired fire retarding characteristics are achieved, highly satisfactory water resistant characteristics by the use of commercially recognized sizing materials such as a rosin size (preferably with alum or an aluminate precipitating agent), a urea formaldehyde resin, or a starch, which are not particularly combustible.

Other important and related aspects of the invention are to provide such a process by which the fire retarding and water-resistance imparting agents are thoroughly and uniformly dispersed throughout the formed final product, by which such agents can be added while the wet matte is being formed and before it is dried, and by which standard matte drying techniques and equipment are permitted to be used.

Other more particular objects and advantages of the invention, will, with the foregoing, appear and be understood in the course of the following description and claims, the invention consisting in the novel construction and in the adaptation and combination of parts hereinafter described and claimed.

Figure 1:
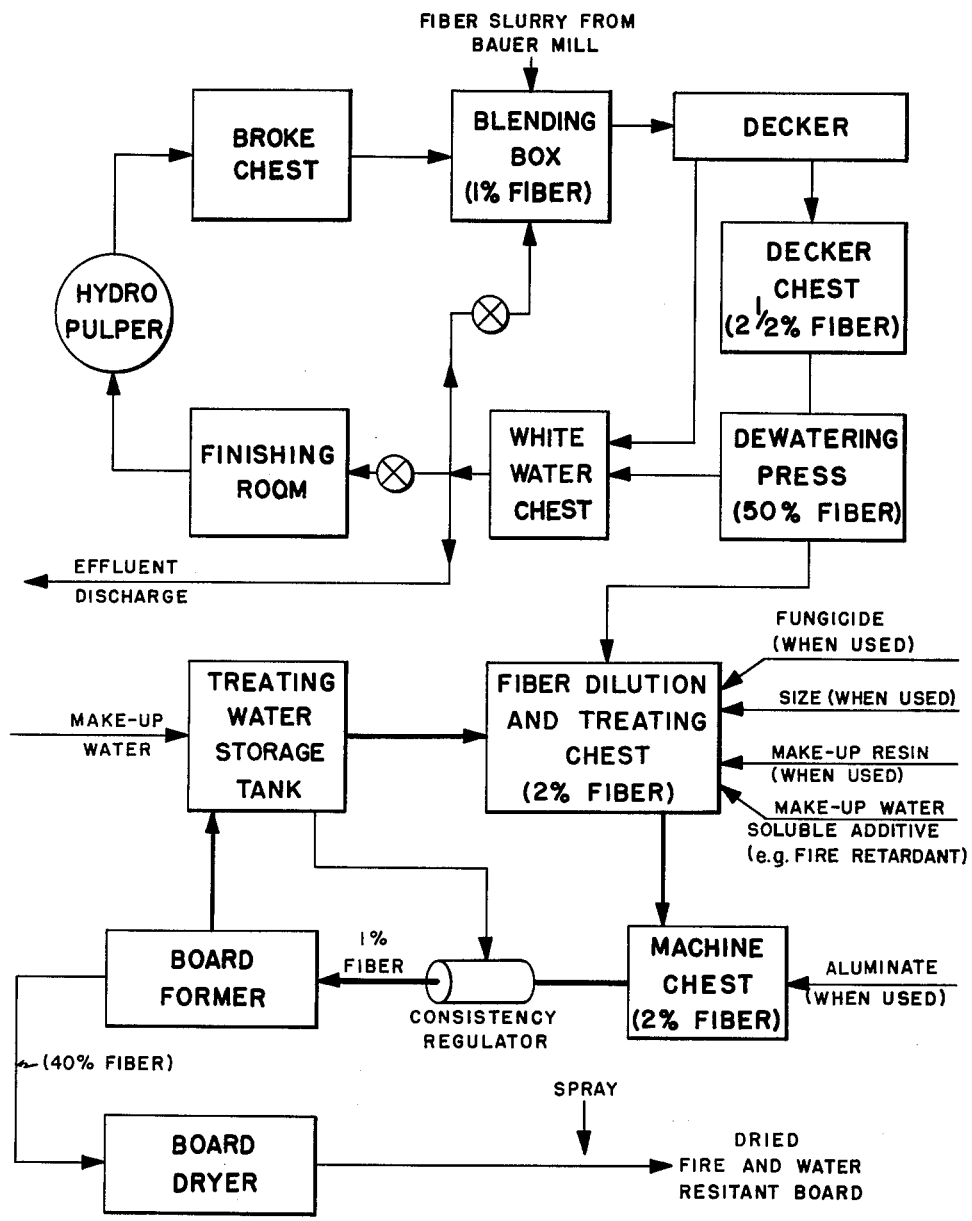
FIG. 1 is a block diagram encompassing a typical flow system for a fiber producing and insulation board forming mill, modified to incorporate a treatment water recycling section characteristic of the present invention, the flow path through such recycling section being shown by heavier arrows, for ease of recognition.

As used herein, the various terms "buffered boric acid," "caustic buffered boric acid," "causticized boric acid," "borated boric acid," and "boric-borate complex" are each used to define either an aqueous solution or solid form deposit of a mixture of boric acid and a metallic borate having a molar ratio of $Na_2O$ to $B_2O_3$ of from about 0.01 to about 0.18, which mixture and relative concentration of equivalent caustic oxide and equivalent boric anhydride can also be equivalently expressed as a mixture having from about 0.5% to about 12% caustic and correspondingly from about 88% to about 99.5% boric acid by weight. As will be evident to those skilled in the art, such mixtures are readily obtainable by any of several techniques, such as by mixing a sodium borate with boric acid, by mixing boric acid with caustic, by using boric acid with sufficient amounts of one or more alkali borates as impurities or additives, by appropriate acidulation of a metallic borate, or by using equivalent mixtures or formulations. While the alkali borate ingredient or the like used to buffer the boric acid has been specifically disclosed as including combined sodium because of readily availability in quantity and comparative low cost of the sodium borates, it will be readily evident that any other alkali borate of sufficient water solubility when admixed with boric acid in water solution, such as a potassium borate, lithium borate or ammonium borate, will serve as well and are to be considered as equivalents. One very suitable buffering ingredient for mixture with boric acid to form the treating solution and fire retardant residual deposit characteristic of the invention is the propriety product Borotherm, marketed by American Potash and Chemical Company, which is a mixture of various sodium borates, predominatntly sodium pentaborate. With respect to the nature of the fire retardant deposit of the buffered boric acid in the formed product of the invention, it has been determined by conductimetric tests that the residual deposit left by evaporation drying of the formed product in normal use consists essentially of boric acid and sodium pentaborate, with varying degrees of water of hydration and water of crystallization, in addition to the normal water of absorption in the product.

Critical to the process of the present invention is the characteristic of boric acid to decrease quite rapidly in pH as the concentration thereof in water is increased. For example, the pH of boric acid is about 5.6 at a 1% concentration whereas the pH is only about 4.0 at a 6% concentration.

By comparison borax by itself has a constant pH of about 9.1 in the range of 1% to above 16% concentration in water, while Borotherm by itself has a pH of about 8.4 when in a 1% aqueous solution, a pH of about 7.9 in a 6% solution, and of about 7.6 in a 10% solution.

Because of the above mentioned characteristics of boric acid a mixture of 3 parts boric acid with one part Borotherm has a pH of about 7.2 in a 1% aqueous solution, about 6.5 in a 6% solution, about 6.1 in an 8% solution, and a drop to about 5.4 in a 12% solution of boric acid plus Borotherm in water.

The significance of the pH is the fact that for effective precipitation of rosin sizing, for example, in a water solution, the pH of the solution should be kept less than about 7.0, preferably less than about 6.5, and ideally less than about pH 6.2. Thus, while neither borax nor Borotherm could be used alone because their pH would not be low enough to maintain sizing precipitation, an 8% concentration in water of a mixture of 3 parts boric acid and 1 part Borotherm, for example, insures a low enough pH for rosin sizing precipitation. Similar portions of borax and boric acid can achieve the same result at higher concentrations. In any regard, the important point is that the ratio of boric acid to the particular borates to be used can be varied to guarantee proper precipitation of the sizing without need of other additives.

Boric acid has some fire retardant properties, but when used alone does not, by contrast to the sodium borates, provide the minimum of flame spread required to meet current strict standards. By the present invention the fire retardant characteristics and value of both the borates and boric acid are utilized and at the same time the boric acid is used for pH control to maintain sizing precipitation in the water solution. This dual function of the boric acid was unknown in the art before the present invention.

Figure 2:
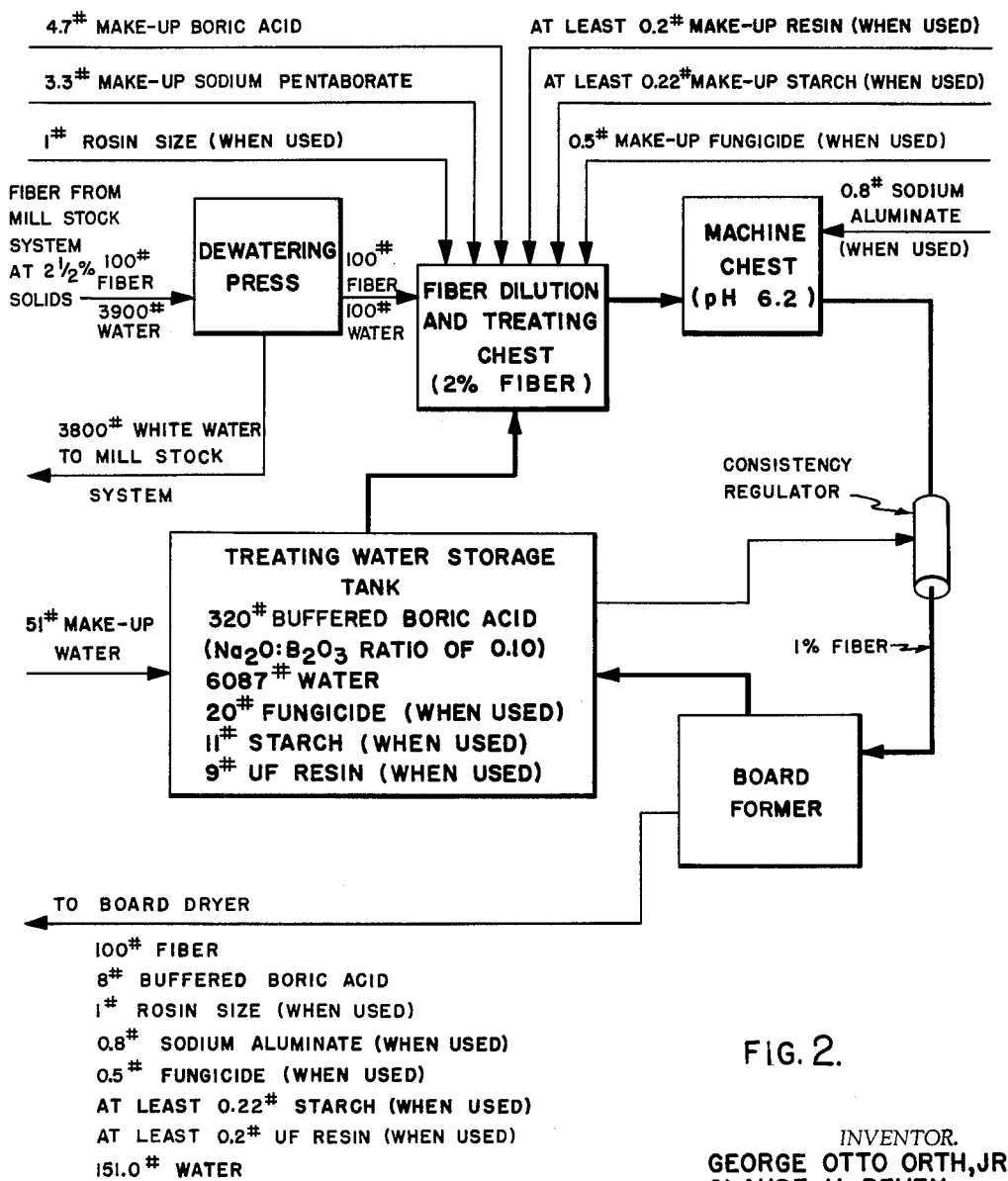
FIG. 2 is a similar diagrammatic presentation of the recycling section or portion of the flow system.

In order to consider more specifically certain aspects of the processing techniques and system features of the present invention, reference should be made to accompanying FIGS. 1 and 2, wherein FIG. 1 is a generalized block diagram encompassing a typical flow system for a fiber producing and insulation board forming mill, modified to incorporate a treatment water recycling section characteristic of the present invention, the flow path through such recycling section being shown by heavier arrows, for ease of recognition.

FIG. 2 is a similar diagrammatic presentation of the recycling section or portion of the flow system, better showing typical proportions of fiber, slurry waters, and particular additives used to form a matted lignocellulose board having representative characteristics typifying the invention.

The board mill layout illustrated by the flow plan of FIG. 1 receives fiber slurry (e.g. wood pulp slurry) from a conventional Bauer Mill, for example, the fiber slurry going to a Blending Box also receiving recycled white water from the White Water Chest through the Finishing Room Hydro Pulper and Broke Chest, as well as directly from the White Water Chest. The dilute fiber slurry in the Blending Box is typically about 1% fiber, by weight. From the Blending Box the fiber slurry goes to the Decker, or other dewatering device, where the fiber slurry is concentrated to about 2½% solids, for example. Extracted water removed at the Decker returns to the White Water Chest. Fiber slurry leaving the Decker passes to the Decker Chest and is then pressed in the Dewatering Press to give so-called dewatered fiber, or wet fiber, a typical concentration of fiber emerging from the Dewatering Press being about 50% fiber and 50% water.

From the press the untreated wet fiber passes to a Fiber Dilution and Treating Chest where recycling treating water from the Treating Water Storage Tank is mixed with the incoming fiber and redilutes same to a concentration of about 2% pulp. Also optionally and preferably introduced to the fiber reslurry at the Fiber Dilution and Treating Chest is a size source material such as a rosin emulsion. Optionally, also, further additives can be introduced in make-up amounts to the incoming fiber at the Fiber Dilution Treating Chest, such as resin, starch, water soluble fungicides, and the like. Insolubilized additives, such as certain known alkaline fungicides, can also be added. Added as well to the incoming untreated fiber at the Fiber Dilution and Treating Chest is a water soluble fire retardant such as the buffered boric acid of the present invention, constituted by make-up borate salt and make-up boric acid, for example. As will be evident, any other or additional water soluble additive, for fire retardant purposes or otherwise, such as a fungicide, a turmectant or a filler, for example, can be maintained in the recycling treating water in like manner by appropriate make-up quantities, as desired.

From the Fiber Dilution and Treating Chest, the fiber slurry passes to the Machine Chest where a size precipitating agent is added, such as sodium aluminate. The sodium aluminate identified as 45–3 and marketed by Hooker Electrochemical Company of Tacoma, Washington, has been found suitable and advantageous for rosin emulsion precipitation, and shows an analysis about 44.0–46.0% sodium aluminate, about 2.5–3.5% excess caustic, and less than 1.0% impurities, principally NaCl. Alum is also very satisfactory for this purpose.

The pH of the fiber slurry under treatment in the Machine Chest is maintained at less than about pH 7.0 and preferably less than about pH 6.5, the optimum pH being about pH 6.15 to 6.25, the pH being determined and maintained so that at least most of the sizing material forms as an insolubilized precipitate on the fiber, the dispersal of the insolubilized sizing material between and interstitially of the fiber being quite intimate and uniform in view of the relatively dilute nature of the fiber in the treating water.

From the Machine Chest, the treated fiber preferably passes through a Consistency Regulator, the output from which is at about 1% solids, for example, after which the treated fiber is delivered to the Board Former.

By action of the Board Former, a fiber mat is formed with removal of water to the point where the pulp concentration is increased to preferably about 40%. The removed treating water is returned to the Treating Water Storage Tank so as to be available for recycling to the new fiber incoming to the Fiber Dilution and Treating Chest. The fiber mat is then dried in the Board Dryer, and may be given subsequent imbibication treatment and/or a surface coating, if desired, as discussed more fully below.

To consider in somewhat more detail certain typical fiber concentrations, as well as certain typical additive materials and concentrations, particular reference is made to the exemplary recycle treatment section illustrated in FIG. 2. The incoming fiber slurry is delivered to the section at about 2½% solids by weight, and the Dewatering Press increases the solids content to about 50%, with extracted white water passing from the Dewatering Press for return to the mill stock system. Typical flow quantities proportionately include 100 pounds of fiber and 100 pounds of water from the Dewatering Press, with 3800 pounds white water drawn off. In the Fiber Dilution and Treating Chest, the wet fiber is rediluted by treating water from the Treating Water Storage Tank. In the Treating Water Storage Tank there are 6087 pounds water containing as solutes 320 pounds buffered boric acid, 20 pounds fungicide (when used), 11 pounds starch (when used), and 9 pounds urea formaldehyde resin (when used). The Fiber Dilution and Treating Chest receives 0.5 pound make-up fungicide (when used), at least 0.2 pound make-up urea formaldehyde resin (when used), at least 0.22 pound make-up starch (when used), and 1 pound rosin size (when used), as well as 3.3 pounds make-up sodium pentaborate (such as the proprietary product Borotherm), and 4.7 pounds make-up boric acid to maintain the fire retardant additive material in the treating solution. 51 pounds make-up water are also received either in the treating Water Storage Tank or as carrier solutions for the various additives introduced to the Fiber Dilution and Treating Chest.

The resulting fiber slurry drawn off the Fiber Dilution and Treating Chest passes to the Machine Chest wherein is added 0.8 pound sodium aluminate (when used), the fiber slurry then passing through the Consistency Regulator to the Board Former. The formed, undried board emerging from the Board Former as delivered to the Dryer incorporates proportionately 100 pounds fiber, 1 pound rosin size (when used), 8 pounds buffered boric acid, 0.8 pound sodium aluminate (when used), 0.5 pound fungicide (when used), at least 0.2 pound urea formaldehyde resin (when used), and at least 0.22 pound starch (when used), along with 151 pounds water.

In a typical installation the weights of materials given at FIG. 2 pass through the treating water recycling section about every 30 seconds, it being understood of course that flow rates and throughput quantities can vary widely in various plants.

With regard to the flow systems illustrated in FIGS. 1 and 2, several important considerations are noteworthy. Of a total of some 3900 pounds white water incoming with the dilute untreated fiber from the mill stock system, only 1000 pounds of such water enters the treatment recycling section, which is a very small intake in comparison with the more than 6000 pounds water in the recycling stages, and which is less than the carryout water in the board emerging from the Board Former, so that there is no buildup in the recycled treating water of water soluble extratives from the mill stock system. Only make-up amounts of buffered boric acid constituents and other additives (when used) are necessary, which make-up amounts proportionately constitute only about 2½% of the total buffered boric acid coursing the recycling section, so that the concentrations and pH balances in the section are quite stable and easy to maintain. Moreover, the amount of buffered boric acid left in the fiber is a direct function of the treating water content of the fiber mat. Therefore, the amount of carryout of buffered boric acid by the formed board passing to the Dryer and the resulting concentration of buffered boric acid deposited in the formed board can be easily regulated, not only by variation of the concentration of additive in the treating water solution but also by simply changing the proportionate amount of treating water solution carried out in the board leaving the Former. All additives are introduced to the fiber when the fiber is in a quite dilute condition, so that the boric-borate complex and the sizing material thoroughly permeate and intimately intermingle with and within the fiber. Also, no additives introduced during the recycling phase of the flow system leave the flow system except in the formed board so that selection of an additive is not limited by any pollution consideration.

Even though commercially used size materials are in the main precipitated by formation of insoluble reaction products or by breakage of the emulsion form of the material, it is nevertheless possible that in many instances some of the sizing materials remain in residue amounts in the treating water. If so, the only way these materials are removed from the water is to eventually go out with the formed board so that their sizing effect is not lost. This is the case, for example, with at least some portion of the urea formaldehyde resin and starch additives used optionally in the flow system illustrated at FIG. 2.

In an experimental mill run based on the concentrations and flow rates presented at FIG. 2 (including all optional additives), very satisfactory results were obtained under the concentrations given, the recycling treating water containing buffered boric acid at about 5% concentration by weight, with the treating chemicals left in the formed and dried board being maintained at a level of about 8% concentration, based on the total weight of the dry board. In this example, the board emerging from the Former had about 58% water, about 38% fiber, and about 4% additive chemicals. The concentrations of additives were selected so that about 9.7% additives based on the total dry weight of the formed and dried board, are distributed through the board, some 7.3% of such board being buffered boric acid.

In terms of economics, the immense practical advantage of recycling the water soluble additives is manifest, particularly when it is considered that a typical fiber plant discharges over two million gallons or more of white water per day. Even aside from pollution control, to attempt to achieve anywhere near adequate additive concentration in the formed product by introduction of the additives to the white water would be economically impractical. The unique advantages in isolating and/or conserving water soluble additive chemicals by a recycled treatment water system are not restricted to the use of any particular types of water soluble additives. Thus, the treatment recycling may be used for addition of other water soluble additives such, for example, as certain normally inert temectant or catalytic agents, such as the proprietary product Non-Com (marketed by the Koppers Company), which when subjected to strong heat liberate water and/or gas to extinguish or retard combustion. By the recycling process, there is thus avoided any limitation or disadvantage from the polution point of view as to what additives are incorporated integrally of the formed product.

As previously indicated, boric acid, because of its characteristic to decrease quite rapidly in pH as its concentration is increased, is used in the present invention for pH control to maintain sizing precipitation as well as being utilized for its fire retarding characteristic. This pH control is particularly significant during the drying operation which may be performed in a standard tunnel furnace at about 350° F. As the board is conveyed through the dryer and water is removed, the borate salts concentrate thereby dropping the pH because of the boric acid present. This drop in pH is sufficient to insure that the sizing (rosin, for example) will be precipitated on the fibers. Drying to about 2% moisture content thoroughly sizes the board so that it will meet the very strictest requirements for sized insulation board.

Under production conditions, formed products of the present invention as they emerge from the Dryer (FIG. 1) exhibit on occasion a degree of surface crystallization of the buffered boric acid additive, particularly at higher concentration levels of the buffered boric acid. Also, the Board Dryer when operated at conventional temperature levels (e.g. 350° F.), tends to remove the water of hydration (i.e., chemically combined water) of the boric acid constituent and the water of crystallization of the borate constituent, as well as the normal water of absorption. While such water of hydration and water of crystallization are eventually recovered from atmospheric moisture under normal conditions of storage and use of the product, such can be immediately restored by a technique known as imbibication, e.g., by spraying, rolling, dipping or flooding water or a water solution on the formed and dried board after it emerges from the dryer, such application being diagrammatically indicated as a spray treatment in the flow system plan illustrated in FIG. 1. Such imbibication treatment, with the liquid a dilute water solution of an alkaline proteinate, sodium borate, a polyol, or mixtures thereof, for example, can serve the dual function of returning the water of hydration and water of crystallization to the dispersed buffered boric acid constituents and also of forming a slight surface layer of proteinate or borate, effectively minimizing any tendency to surface crystallization of the buffered boric acid. Obviously, the resulting slight layer of proteinate, borate or polyol, as the case may be, does not modify the integral treatment of the product as characterizes the invention. As will be apparent, any surface crystallization can also be at least partially covered by a surface coating, if desired. Other techniques for minimizing any tendency for the buffered boric acid to surface crystallize and for restoring normally contained water to the formed product will readily occur to those skilled in the art.

As will be evident, the integral deposition of fire retardant and/or other additives in matted lignocellulosic products according to the present invention can be advantageously combined with surface coating techniques which are generally known and conventional per se, it being in fact a further characteristic of the present invention that such products as combine an integral deposit of such additives along with surface coatings exhibit marked and surprising improvement in properties particularly in porous products such as acoustical board.

In order to demonstrate such improvement in properties when combining integral and surface coatings, representative acoustical tile type insulation boards were formed with integral additive deposit by the technique shown and discussed in connection with FIG. 2, the additives including about 8% buffered boric acid of molar ratio of 0.10, about 1% rosin size, about 0.8% sodium aluminate, about 0.22% starch and about 0.2% urea formaldehyde resin, by weight based on the dry weight of the board. To the integrally treated board thus formed various coatings were applied after the samples were conditioned to equilibrium at 30% relative humidity and 80° F. Testing was performed by the so-called "tunnel test" according to Proposed Standard E84-58T of the American Society for Testing Materials (ASTM), the test indices of the boards under test being based on their relationship to the burning characteristic of red oak. Three indexes were utilized, and namely, the flame spread, the fuel contribution index (amount of fuel contributed in the tunnel furnace by the test specimen), and the smoke density index. For red oak the flame spread index is 100 and complete non-combustibility as evidenced by cement asbestos board, is an index of zero on the scale of flame spread index. If the distance of flaming is but 75% of the distance burned on red oak under the same conditions, then the flame spread index is 75. Likewise, if a given distance burned in the material equals distance burned in half the time as required for red oak then the flame spread index is 200.

Test results were as follows:

tests demonstrate that integrally treated boards made in accordance with the present invention not only have very superior fire resistance without further treatment, but also can be used without deleterious effect with a wide variety of commercially known types of coatings.

In commercial practice there are several product properties other than first retardance and water resistance which are important to production considerations in the types of products here involved. These further properties are in general mechanical or physical in nature and include several considerations involving structural characteristics, and also what is generally known as workability or machineability. In the category of structural characteristics, and also what is generally known as workability or machineability. In the category of structural characteristics, flexural strength, tensile strength, modulus of elasticity and breakability are notable. Concerning workability, such factors as drillability and abradability are involved, as well as sandability, planability and jointerability. Paintability is also an important consideration and, in storage and utilization, the mold and bacterial resistance of such products is likewise important.

With regard to flexural strength, panels with deposited granular borax exhibit loss of flexural strength, probably because of the relatively high pH and the displacement of some of the fiber with a granular non-adhesive material. However, when using buffered boric acid in the molar ratio range of the present invention, it was found that relatively increased flexural strength results in many instances, and that there is at least no significant adverse effect on the flexural strength of the product. With regard to tensile strength and modulus of elasticity, tensile strength was increased when the board incorporated dispersed buffered boric acid, as compared with a non-impregnated board, whereas some deterioration in tensile strength was produced when the specimens were impregnated with straight borates. Improved stiffness also characterized those specimens having integral treatment with buffered boric acid.

As to breakability, products characteristic of the present invention also proved easily disintegratable, which is a desirable factor in production to facilitate reuse of process broke.

Addition of the starch and urea formaldehyde ingredients was found to further augment and increase the desired structural properties, particularly with respect to

| Specimen | Board type | Surface modification | Coating | Flame spread index | Fuel contr. index | Smoke density index |
|---|---|---|---|---|---|---|
| (1) | Red oak | | | 100 | 100 | 100 |
| (2) | Cement asbestos | | | 0 | 0 | 0 |
| (3) | Untreated acoustical | Perforated | A | 98 | 75 | 53 |
| (4) | Untreated acoustical | Calendered and perforated | B | 51.3 | 47 | 32 |
| (5) | Integrally treated | None | None | 12.8 | 35 | 3 |
| (6) | do | Calendered and perforated | C | 15.4 | 32 | 10 |
| (7) | do | None | D | 10.3 | 33 | 3 |
| (8) | do | Fissured | D | 10.3 | 29 | 5 |
| (9) | do | Calendered | B | 5.7 | 22 | 9 |
| (10) | do | Calendered and perforated | B | 5.1 | 25 | 10 |

In the above specimens, Coating A involved a styrene butadiene latex binder and carbonate, clay and titania pigment system Coating B involved an intumescent coating comprising a polyvinyl chloride binder system, a titania pigment system and a foaming agent of the type described in Stilbert et al. U.S. Patent 2,755,260, Coating C involved a polyvinyl acetate binder system with an alkaline borate and a pigment system including clay, carbonate, mica, diatomaceous earth and titania, and Coating D involved a polyvinyl acetate binder with an alkaline borate and a pigment system including clay, diatomaceous earth, titania, precipitated carbonate and dolomitic limestone.

The various specimens involved in the above tabulated stiffness, it being notable in this regard that the stiffer the material the better for certain fabrication techniques, such as that of fissuring in the acoustical board art where conventional products are normally pre-embrittled to enhance workability, such as disclosed in Proudfoot et al. Patent No. 2,791,289 for example. Products characteristic of the present invention have fibers embrittled to a degree so that no further embrittlement is necessary.

Another very important physical property of products involved in the present invention is that known as sandability. Good sandability permits the products to be sanded by conventional sanders such as drum or belt type sanders. A conventional board has poor sandability in that the sanded product inherently has pockets resulting from pulling out of little tufts of fiber by the pulling action of the sander. Integrally treated products according to the present invention exhibit very good and in many cases even excellent sandability, even comparable to that of wood. Surface smoothness by sanding is obtainable which heretofore required a calendering operation for many types of matter products. Possibly one explanation for this better sandability is that there is some cementitious action on the lignocellulosic fibers by the boric acid.

The fabrication operations of planning and jointering also reveal substantially improved workability properties attributable to the products here involved. Kerfs, bevels and grooving are formed with smoother surfaces and less tuft tear-out and protrusions than occur by use of the same fabricating equipment on conventional products.

As to drillability, a noticeable improvement also pertains, in comparison with products not given an integral treatment. Drills used in the art are of both the twist drill and tubular drill types. Use of tubular drills present no serious problem even with non-impregnated products, but a much more brittle board is required for twist drill fabrication of drilled patterns, and holes formed by twist drills in products of the invention exhibit much smoother hole sides and reduced tufting tendency than found in conventional products.

Integrally treated products made in accordance with the present invention display no adverse results as to paintability, and conventional paints can be used equally as well on products so treated.

Another important improvement characteristic of the fire retardant additive of the present invention is found in the mold and bacterial resistance of products incorporating such material. Because of the boric acid and borate present, there is a significant increase in the mold and bacterial resistance of the product, so that additional fungicides can in many instances be omitted or at least reduced in amount.

In the system thus far described for impregnating the board fibers with additives, the additives are introduced when the fiber is in a dilute slurry state and the additive-containing slurry water is recycled. As an alternative to this procedure, in FIG. 3 there is illustrated a modified system in which the additive impregnation of the fibers is accomplished by introducing the additive containing solution to the fiber when the fiber is in the matte state, i.e. is at the board former rather than in the slurry state. More specifically, in the modified process the fire retardant is added to the fiber matte under controlled conditions to provide essentially water-with-water displacement of a part of the white water from the fiber mat with chemical solution as water is being extracted from the fiber matte, and at such a time as the fiber matte has a particularly good fiber-to-water concentration for the purpose.

Figures 3, 4:
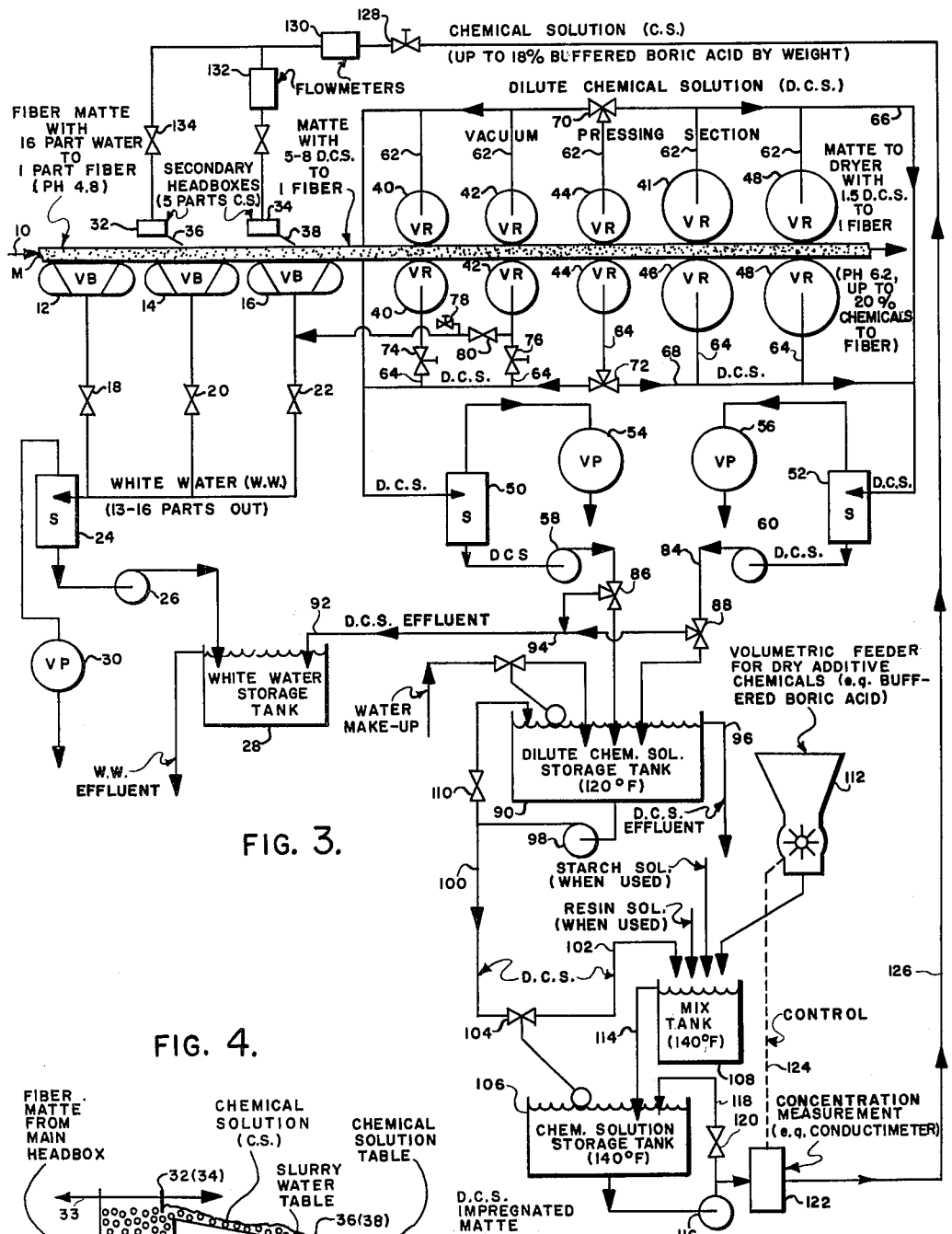
FIG. 3 is a flow diagram of a modified system incorporating the present invention.
FIG. 4 is an enlarged fragmentary view of the secondary head box area in the modified system.

Referring to FIG. 3 it will be understood that the fiber matte M has been conventionally derived, as from pulp slurry flowing from a conventional slurry system headbox (not shown), the initial pulp slurry having a water-to-fiber concentration of about 50:1 fiber solids, the matte proceeding over the conventional infeed breastroll on the conventional Fourdrinier supporting wire of a so-called board former, the direction of infeed of the matte on the wire being indicated by the arrow 10. The pulp slurry and fiber matte M as it proceeds into the board former can comprise various additives imparted to the pulp while in the slurry stage, such as the rosin or other sizing agent (typically present in the amount of about 0.5% rosin solids to fiber solids, for example), and is of a regulated acidity (e.g. pH 4.8) compatible with size precipitation.

As the fiber matte proceeds from the slurry system headbox into the board former, gravitational drainage of water from the matte results in a substantial initial decrease in its water content. In the flow system shown in FIG. 3, such gravitational drainage of slurry water from the fiber matte is allowed to proceed to the point where the fiber-to-water ratio in the matte M is about 16 parts water to 1 part fiber, whereupon the matte M encounters the first of three Rotabelt equipped vacuum boxes (VB) designated 12, 14 and 16, respectively. Said vacuum boxes 12, 14, 16 are conventional per se and the slurry water or white water (W.W.) discharge therefrom proceeds through respective flow regulating valves 18, 20 and 22, the separator (S) designated 24, and pump 26 to white water storage tank 28, with vacuum being supplied for boxes 12, 14, 16 by the vacuum pump (VP) designated 30, again in a manner conventional per se.

In its progress over vacuum boxes 12, the water-to-fiber concentration of the fiber matte M is reduced from about 16:1 to about 10–13:1; over vacuum box 14 is further reduced to about 8–12:1; and over vacuum box 16 is further reduced to about 5–8:1 depending upon the nature of the fiber, the speed of travel of the matte, and the extent of vacuum in the vacuum boxes. As the fiber matte progresses over the second and/or third boxes, i.e. vacuum boxes 14 and 16, additive chemical solution (C.S.) is flowed onto the top of the matte M, preferably in two or more successive sheets, such as from respective secondary headboxes 32, 34, the manner of discharge of the additive chemical solution to the matte being suitably by respective inclined surfaces 36, 38 (also note FIG. 4) extending the width of the matte. With the matte eight feet wide and progressing at thirty feet per minute, for example, the total feed of chemical solution from secondary headboxes 32, 34 is at the rate of about 100 gallons per minute. The chemical solution adds about 5 parts chemical solution per part of fiber, and the slurry water extracted from the matte by vacuum boxes 12, 14, 16 totals about 13–16 parts. Importantly to the process, and as diagrammatically shown in FIG. 4, the nature of the water content of the matte as the chemical solution flows thereon above vacuum boxes 14 and/or 16 is such that there is a sufficient water content so that the slurry water is displaced by the chemical solution essentially on a water-with-water displacement basis.

If the fiber content of the matte is too diluted by water, then so much water is drawn off to render the chemicals of the chemical solution not practicably recoverable from the slurry water. However, if the matte is relatively dry to the point that there is no longer a substantial liquid phase of the entrained liquid, then the process is uneconomical and the chemical solution appears principally on the upper surface of the fiber matte. In order to obtain substantially uniform distribution of the chemical solution throughout the fiber matte, with only minimal loss of chemical solution to the white water, the water-with-water displacement of slurry water by chemical solution is necessary, and is to be controlled on a basis so that a comparatively minor proportion of the chemical solution proceeds entirely through the matte and is pulled off with the white water at the last vacuum box 16 and/or the first stage or stages of the vacuum pressing section (noting valves 78, 80, infra).

FIG. 4 illustrates somewhat diagrammatically an idealized condition with respect to water-with-water displacement of slurry water from the wet fiber matte by chemical solution, and portrays on an enlarged scale the area of the board former occupied by the vacuum boxes 12, 14, 16 and the secondary headbox means 32, 34. In the representation of the ideal operating condition, as presented by FIG. 4, the thickness dimension of the matte M has been further enlarged for clarity of illustration, and appropriate distinction is made between the liquid phase slurry water (designated by crosses), the fiber assimilated slurry water (designated by dashes) and the additive chemical solution (designated by circles).

As the fiber matte progresses from the main headbox toward vacuum box 12, the water content thereof, and particularly the liquid phase slurry water content, progressively decreases by gravitational flow until the water-to-fiber concentration is about 16:1 at the input side of vacuum box 12. Then, by action of the vacuum box 12, the water-to-fiber concentration is reduced to about 10–13:1 at a point about between vacuum box 12 and vacuum box 14. At about this concentration of water-to-fiber, the slurry water table (so designated in FIG. 2) noticeably begins to disappear from the upper surface of the matte, but is not drawn entirely through the matte. Then, by action of vacuum box 14, the water content is further decreased and the slurry water rabble continues to be drawn down through the matte, and it is at this point of the progress of the matte across the vacuum boxes that the additive chemical solution is added. The secondary headbox 32 for flowing chemical solution onto the matte is arranged to be adjustably in the direction of travel of the matte, as schematically shown by the arrow designated 33, in order that the placement of the flow line of the chemical solution onto the matte is adjustable. Other regulatable factors are also operationally available, such as the degree of vacuum applied by each of the vacuum boxes 12, 14, 16, and such as the speed of travel of the matte. Considered from the point of view of operational control, the flow line for the chemical solution from the secondary headbox means 32 is desirably positioned to fall just beyond the visibility discernible disappearance of the slurry water table from the upper surface of the matte.

Thus, as shown in FIG. 4, as the slurry water table disappears from the surface of the matte at about its exit point from vacuum box 12, and is drawn progressively down through the matte by action of vacuum box 14, the chemical solution from secondary headbox 32 is flowed onto the upper surface of the matte so as to form a chemical solution table (so designated in FIG. 4) extending over an area directly above the slurry water table so that the vacuum seal provided by the existence of a continuous liquid phase of water in the matte is not broken. By such arrangement of the disappearing slurry water table and entering chemical solution table so as to be vertically related over vacuum box 14, the drawing of the chemical solution table down into the body of the matte by the continuing suction from vacuum box 14 and/or box 16 is assured. FIG. 4 also portrays this progress of the chemical solution throughout the matte, by showing that the chemical solution table reaches the under surface of the matte while the matte is over vacuum box 16. The extent of chemical solution drawn down into vacuum box 16 and discharged with the slurry water is to a degree an operational compromise between the toleration of loss of a proportion of the additive chemicals and toleration of a somewhat more diluted chemical solution content in the fiber matte proceeding to the vacuum press roll section of the board former. In typical practice, it has been found advantageous to draw off some of the chemical solution with the slurry water, i.e. have the chemical solution table reach the under surface of the matte slightly before exit of the matte from the vacuum box 16, in order to maintain relatively good concentration of chemicals in the dilute chemical solution left in the matte, and in order to assure substantially uniform distribution of the chemical solution throughout the body of the matte.

Relating the progressive water-to-fiber concentration in the matte to the idealized manner of operation illustrated at FIG. 4, the water-to-fiber concentration of the matte entering the second vacuum box 14 is about 10–13:1, and the desired concentration in the matte at the time of introduction of the chemical solution is about 5–12:1, considering that introduction of chemical solution can be placed at any desired location or locations over the vacuum boxes 14 and 16. The resulting dilute chemical solution impregnating the matte at its exit point from vacuum box 16 is about 4–5 parts chemical solution and about 1–3 slurry water, with a relatively small amount (up to 1 part) of the chemical solution being drawn off with the slurry water at vacuum box 16.

In practice, and as shown in the flow diagram of FIG. 3, it has been found preferable to employ two secondary headboxes rather than one, for the reason that the wet fiber matte at the time of application of the chemical solution is quite soft and susceptible to surface disturbance or upset. Less disturbance of the upper surface of the matte results if the chemical solution is flowed thereon in two or more stages rather than one, and it has been found that the ideal water-with-water displacement shown in FIG. 4 can be reasonably approximated by use of two secondary headboxes 32, 34 respectively positioned about over vacuum boxes 14, 16. By the use of the two secondary headboxes 32, 34 the distribution of the dilute chemical solution throughout the body of a matte is to a degree a two-step water-with-water displacement procedure with the slurry water table drawn down only part way through the matte by vacuum box 14, and with some intermingling of the slurry water table and initial chemical solution table. However, as indicated at FIG. 4, both of secondary headboxes 32, 34 are adjustable along the path of travel of the matte and a wide degree of flexibility is provided for operational control of the production conditions, in terms of the proportionate amount of chemicals drawn off with the slurry water in vacuum box 16, the extent of surface disturbance which can be tolerated, and uniformity of distribution of the chemicals in the matte existing from vacuum box 16, and the relative concentration of chemicals in the dilute chemical solution as such appears in the matte proceeding to the vacuum press section.

From the vacuum box section, the fiber matte impregnated with dilute chemical solution proceeds to the vacuum pressing section of the board former, which comprises a series of successively encountered upper and lower pairs of small vacuum rolls 40, 42, 44, and large vacuum rolls 46, 48. Said vacuum rolls 40–48 are of a type conventional per se and have associated therewith separators 50, 52, vacuum pumps 54, 56 and liquid pumps 58, 60, each also conventional per se and providing parallel extraction flow from the various vacuum rolls 40–48. For operational flexibility, the vacuum pressing section arrangement incorporates alternate or parallel flow lines connecting respective upper and lower discharge lines 62 and 64 from vacuum rolls 40–48 to separators 50 and 52, such flow being by upper and lower header lines 66 and 68, each provided with respective control valves 70 and 72 for L-flow or T-flow. As apparent, the dilute chemical solution extracted from the fiber matte by the various vacuum rolls 40–48 can be drawn off by any suitable vacuum and pumping arrangement other than that specifically shown. Also, to provide system flexibility, the lower discharge lines from lower vacuum rolls 40, 42 are provided with individual control valves 74, 76, by means of which either or both of these lines can be isolated from the dilute chemical solution discharge flow path and connected by means of respective control valves 78 and 80 to the vacuum discharge from vacuum box 16 to remove the most dilute part of the dilute chemical solution as effluent with the white water discharged from said vacuum box 16. Taking surplus dilute chemical solution from the vacuum pressing section only on the lower side of the matte at lower vacuum rolls 40 and 42 is somewhat advantageous to discharging dilute chemical solution of average concentration in that the initial dilute chemical solution drawn off from the bottom of the matte as it enters the vacuum pressing section in some operational circumstances tends to be of relatively reduced chemical concentration and therefore results in relatively reduced loss of chemicals from the chemical recycling system.

Outflow of dilute chemical solution from either or both of pumps 58, 60, as the operational case may be, is led through lines 82, 84 and control valves 86, 88 to discharge points delivering same to the dilute chemical solution storage tank 90. Said valves 86, 88 are of the I-flow or L-flow type and serve as further possible points of dilute chemical solution effluent discharge, as by line 92 leading to white water storage tank 28.

Said dilute chemical solution storage tank 90 is advantageously maintained at somewhat elevated temperature (e.g. 120° F.) to promote solubility of the dissolved chemicals for ready handling, which somewhat elevated temperature is maintained by suitable means such as immersed steam coils (not shown). Also it is preferable particularly with relatively high chemical solution concentrations to provide said dilute chemical solution storage tank 90 with agitation means, conventional per se.

Should certain operating conditions require make-up water addition to the chemical solution recycling system, the water make-up readily can be introduced at dilute chemical solution storage tank 90, as by leading water inlet line 92 to float valve 94 and then to a point of discharge in the tank 90. Also, a further point of dilute chemical solution effluent discharge can readily be arranged in tank 90, as by overflow line 96.

Dilute chemical solution is withdrawn from the dilute chemical solution storage tank 90 as needed for chemical solution make-up in the manner hereinafter discussed, by means of liquid pump 98 and its feed lines 100, 102, said line 100 passing through a float valve 104 operating in the chemical solution storage tank 106, and said line 102 discharging into mix tank 108. Overpressure relief valve 110 is also situated on the outfeed side of pump 98 to return pumped dilute chemical solution to dilute chemical storage tank 90 when not called for by float valve 104.

As indicated with respect to the constituency of the liquid phase of the matte as it enters the vacuum pressing section, the dilute chemical solution is usually only slightly more than half as concentrated as desired for introduction to the fiber matte at vacuum box 16. It is essentially the function of mix tank 108 and its associated components to restore the concentration of the solution.

Chemical solution tank 106 and mix tank 108 are suitably agitated and maintained at elevated temperature (e.g. 140° F.) in like manner as the dilute chemical solution storage tank 90, and mix tank 108 is provided with suitable discharge means such as overflow line 114 leading to the chemical solution storage tank 106. Discharge of the chemical solution at restored concentration from storage tank 106 is by means of liquid pump 116 with excess outflow being returned through line 118 and overpressure relief valve 120 to the storage tank 106. The recycling system outflow from pump 116 preferably passes to a continuously operated concentration measurement means 122, such as a conductimeter which effects a continuous mechanical or electrical control (indicated by broken line at 124), regulating the amount of dry chemicals fed from volumetric feeder 112. As will be apparent, such monitoring of the chemical solution concentration and regulation of the amount of dry additive chemicals delivered to mix tank 108 to provide for automatic operation on a continuous basis in this respect are preferable to manual monitoring or spot checking of the solution concentration. However, as will also be apparent, the quality control of solution concentration can be effected in any other manner desired, and the outfeed from chemical solution storage tank 106 can simply be directed to the secondary headboxes 32 and 34, if desired.

In the flow sequence shown at FIG. 3, the chemical solution after passing the concentration measurement means 122 is delivered by line 126, flow control valve 128, flow meters 130 and 132, and respective flow control valves 134 and 136, to secondary headboxes 32 and 34. Flow meter 130 serves to indicate the total rate of flow of chemical solution of the secondary headboxes 32 and 34, and flow meter 132 serves to indicate that portion of the flow going to secondary headbox 34. As will be evident, the total flow is regulatable by control valve 128, and the proportion of flow to the respective headboxes 32 and 34 is controlable by control valves 134 and 136, flow meter 132 indicating the rate of flow to secondary headbox 34 and the difference in rates reflected by flow meters 130 and 132 indicating the rate of flow to secondary headbox 32.

This modified system of chemical addition has the capability of realizing relatively high chemicals-to-fiber solids concentration in the formed board. By use of buffered boric acid at somewhat elevated temperature, the chemicals-to-solids concentration of the chemical solution delivered to secondary headboxes 32 and 34 can be conveniently as high as about 18% by weight. Good commercial operating practice establishes that the matte as it emerges from the vacuum pressing section and goes to the associated dryer has about 1.5 parts dilute chemical solution to 1 part of fiber.

To further illustrate the effectiveness of the present invention, various samples of lignocellulose acoustical tile made according to the procedure shown in FIG. 3 were selected and tested for flame spread characteristics under "tunnel test" conditions (ASTM desig. E84–60T). The acoustical tiles tested in this regard were constituted s follows:

| | Percent buffered boric acid (with 0.5% rosin size) | Average weight, oz. |
| --- | --- | --- |
| Sample "A" | 3.0–4.1 | 12.25 |
| Sample "B" | 6.0–7.8 | 12.54 |
| Sample "C" | 8.9–10.4 | 12.64 |
| Sample "D" | 12.3–15.2 | 13.16 |

All acoustical tiles tested were of a standard commercial size and were fissure faced, tongue and groove edge cut, with edges coated and bevelled. Test results were as follows:

| Test Specimen | Flame spread index | Fuel contributed index | Smoke density index |
| --- | --- | --- | --- |
| Cement-asbestos | 0 | 0 | 0 |
| Red oak | 100 | 100 | 100 |
| Sample "A" | 46 | 43 | 38 |
| Sample "B" | 26 | 31 | 14 |
| Sample "C" | 21 | 27 | 9 |
| Sample "D" | 13 | 23 | Negligible |

From the foregoing description of alternative techniques of integral treatment of the fibers it will be apparent that various other modifications and adaptations of all or some of the described details, steps, and features will occur to those skilled in the art without departing from the basic teachings of the present invention.

With respect to generalized considerations involved as to certain additive formulations and concentrations, as well as the interrelated matter of product density, the general range of molar ratio of $Na_2O$ to $B_2O_3$ contributed by the buffered boric acid constituents, and the typical nature of such constituents, have been previously indicated. As has also been indicated, the maximum molar ratio which is funtionally tolerable can vary to some extent depending upon the specific nature of the fiber source and fiber stock and the desired product type and classification, as well as the relative amounts of other additives, such as size, when such are present. With respect to the molar ratio of $Na_2O$ to $B_2O_3$, and while the commercially advantageous range is from about 0.01 to about 0.18, it has also been determined that a preferred range exists from about 0.04 to about 0.14, and that the optimum molar ratio is about 0.10. Concerning the related factor of pH of the treating water solution, it has been determined that, at least for effective simultaneous size precipitation, the pH of the treating water should be less than about pH 7.0, preferably less than about pH 6.5, and optimally about pH 6.2. In the case of lignocellulosic insulation board it has been determined that the formed insulation board should have a density of at least about 10 pounds per cubic foot and preferably at least about 14 pounds per cubic foot, that the buffered boric acid should be present in an uncoated board in an amount at least about 8% by weight of the dry weight of the board and preferably at least about 11% by weight of the dry board, that the sizing material when the present should result in an insolubilized size in the amount of from about 0.5% to not over about 2% by weight of the dry weight of the board, and be preferably present in the amount of about 1% by weight of the dry weight of the board with the preferred size material being rosin, and that the size material precipitating agent when present is preferably in the amount of from about 0.5% to about 1.5% by weight of the dry weight of the board, the optimum amount of precipitating agent being about 0.8% by weight of the dry weight of the board, the preferred precipitating agent being sodium aluminate. Further determinations indicate additional property improvements of a comparatively minor nature can be gained by simultaneous deposition and dispersal in the product of one or more materials such as urea formaldehyde resin and starch, the amount of resin or starch, or both, when present preferably being from about 0.1% to about 1.0% of the dry weight of the board, the optimum amount of such additional ingredients being about 0.5%.

Although likewise not essential to the invention, additional striking further improvements in fire retardancy can be attained by applying a surface coating to the integrally treated product, such as a borate salt, which surface coating can be a type conventionally known per se in the art and applied in conventional amounts and by conventional techniques. With respect to the product involving both integral treatment and surface coating a further quite satisfactory variation in product make-up to produce a product having acceptable water resistance as well as acceptable fire retardancy involves integral treatment with only buffered boric acid, followed by a surface coating on the facing, for further fire retardance, and a size surface coating on the back of the product, for water resistance.

With respect to product density, and as will be readily understood, the relatively less dense types of products, such as acoustical or thermal insulation board, present more stringent problems in the development of a given level of fire retardance, and to a degree a given level of water resistance also, because of the relatively open fiber disposition in these products, i.e. their porosity. Correspondingly, it will be recognized that wider variations in additive formulations and constitutents are possible when the product is more dense because the inherent tendency to flammability and wet disintegration of such denser products is less.

With respect to the specific sizing material, when present, many variations are possible. Rosin size is preferred together with a precipitating or flocking agent such as sodium aluminate or aluminum sulphate in the manner well known in the art. Additional sizing agents such as petroleum wax sizing, chlorinated wax sizing, and asphaltic sizing agents can be used in particular products, taking into due consideration the possible adverse effect on flame spread and combustibility of such additives as petroleum waxes and asphaltic type constitutents. It should be recognized that the present invention takes advantage of the sizing materials naturally present in wood by maintaining a suitable pH environment.

As to specific lignocellulosic materials usable as a source material for fiber in the make-up of products characterizing the present invention, and as well as the more conventional wood or bark from various species of trees, both hard and soft, lignocellulosic materials obtained from annual products such as corn stalks, corn cobs, straw, sugar cane stocks, and the like, can also be employed. The lignocellulosic fibrous material is preferably obtained by forming a slurry of water and fibers, with the product preferably being formed from such slurry by water extraction and fiber deposition.

In the foregoing description and examples, all references to concentrations, proportions and percentages are by weight, unless otherwise indicated.

From the foregoing disclosure, various further modifications, alterations, variations and adaptations in the processing and system aspects, in the compositional aspects, and in the product form, nature and constituent make-up here involved will occur to those skilled in the art within the scope of the following claims.

We claim:
1. A process of producing a water-resistant and fire-retardant lignocellulosic product comprising the steps of wetting lignocellulosic fibers with a solution containing rosin size and a precipitating agent selected from the group consisting of alum and an aluminate, adjusting the pH to an acidic condition by the concomitant use of buffered boric acid with said precipitating agent for precipitation of the rosin size on said fibers, and drying the fibers and using said buffered boric acid to keep the pH low enough during the drying to maintain said precipitation of the rosin size for sizing the fibers.

2. The process of claim 1 in which the pH is about 6.2 at the commencement of said drying, said pH thereafter decreasing responsive to the drying.

3. The process of claim 1 in which said buffered boric acid has a molar ratio of $Na_2O$ to $B_2O_3$ of about 0.01 to 0.10 and a chemical-to-water concentration of up to about 18%.

References Cited by the Examiner
UNITED STATES PATENTS

| | | | |
|---|---|---|---|
| 1,860,134 | 5/1932 | Brown | 162—159 |
| 1,939,082 | 12/1933 | Quinn | 162—159 |
| 2,030,653 | 2/1936 | Quinn | 162—159 |
| 2,606,115 | 8/1952 | Nuessle | 162—159 |

DONALL H. SYLVESTER, *Primary Examiner.*